G. C. Fitch.
Churn.
No. 75539    Fig. 1.    Patented Mar. 17, 1868.
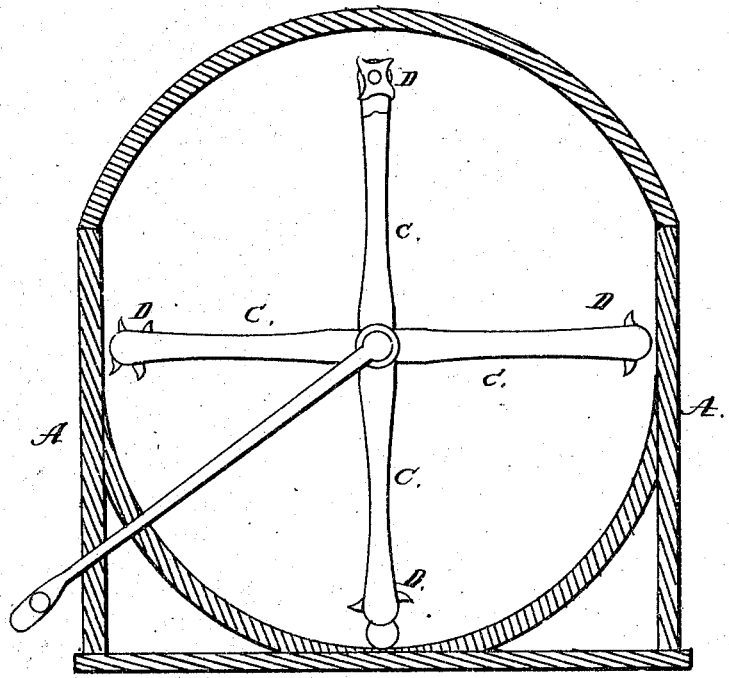
Fig. 2.
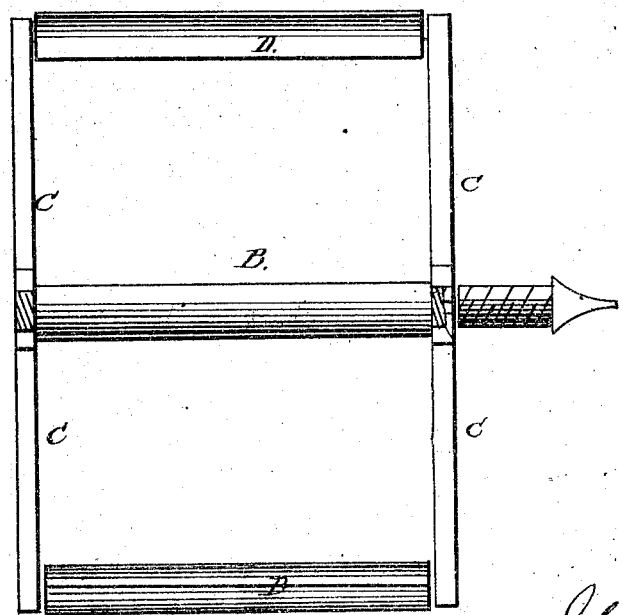
Attest:    Inventor: G. C. Fitch
per Alexander & Mason
Att'ys

United States Patent Office.

GEORGE C. FITCH, OF RANDOLPH, NEW YORK.

Letters Patent No. 75,539, dated March 17, 1868.

IMPROVEMENT IN CHURNS.

The Schedule referred to in these Letters Patent and making part of the same.

TO ALL WHOM IT MAY CONCERN:

Be it known that I, GEORGE C. FITCH, of Randolph, in the county of Cattaraugus, and in the State of New York, have invented certain new and useful Improvements in Combined Churn and Butter-Worker; and do hereby declare that the following is a full, clear, and exact description thereof, reference being had to the accompanying drawings, and to the letters of reference marked thereon, making a part of this specification.

In the annexed drawings, A represents a churn-box, which has a curved bottom and top. Placed crosswise of this box is a shaft, B, which is provided with adjustable bearings, by means of which the said shaft may be removed at will. Secured upon the shaft B are four cross-arms, C C C C, two at each end. Near the extremities of these arms are four buckets, D D D D, which are so constructed as to each form four lips for catching the cream and working it. The ends of these buckets are tenoned, and rest in bearings in the arms C, and are loosely connected, so that they will revolve upon their bearings. The arms C are sufficiently long to bring the buckets D within a short distance from the bottom of the churn as they revolve. The shaft B is revolved by means of a crank-handle on the outside of the churn-box. The arms C C act as dashers in churning the butter, while the revolving buckets D D act as workers for the butter while it is being formed. The action of these buckets will gather the butter in lumps, and by means of the construction of their elongated lips, the cream will keep them steadily revolving.

I am aware that a corrugated or fluted roller has been used upon the arms in a churn-box before. The pressure of the cream is equal on all parts of a roller of this description.

What I claim as new, and desire to secure by Letters Patent, is—

The arrangement of the buckets D D, provided with four elongated lips, as described and used upon the arms C C, in the box A, substantially as specified.

In testimony that I claim the foregoing, I have hereunto set my hand, this 21st day of May, 1867.

GEORGE C. FITCH.

Witnesses:
 RUFUS CROWLEY,
 MARCUS H. JOHNSON.